United States Patent Office

2,710,296
SUBSTITUTED TRIAZOLES

Reuben G. Jones and Cameron Ainsworth, Indianapolis, Ind., assignors to Eli Lilly and Company, Indianapolis, Ind., a corporation of Indiana No Drawing. Application April 13, 1953,
Serial No. 348,554

6 Claims. (Cl. 260—308)

This invention relates to triazoles and more particularly to substituted 3-ethyl-1,2,4-triazoles and their acid addition salts.

The bases of the compounds of the present invention can be represented by the formula:

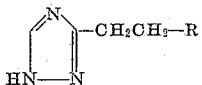

wherein R represents an amino, lower alkylamino, lower dialkylamino, monocyclic arylcarboxyacylamino, lower aliphatic carboxyacylamino, or monocyclic-aryl-lower-alkylamino radical. It will be apparent that since the compounds contain basic amino groups, they can form acid addition salts.

The bases of the new triazoles are low-melting solids which are soluble in water and alcohol but are relatively insoluble in the common non-polar organic solvents. The acid addition salts of the compounds are in general soluble in water.

The compounds are useful for their physiological action, in that they are capable of lowering the blood pressure of the mammalian organism when administered orally or parenterally.

The compounds can readily be prepared by methods known to the art. The following series of equations, which illustrates the preparation of 3-β-aminoethyl-1,2,4-triazole dihydrochloride shows the course of the reaction in one method of preparation.

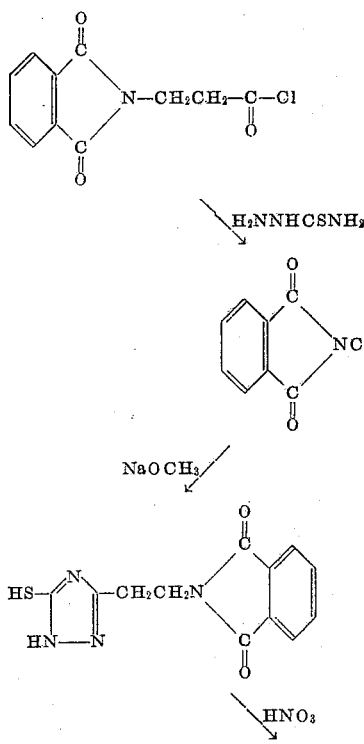

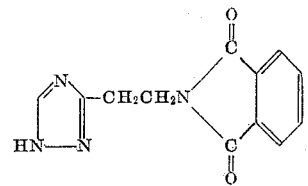

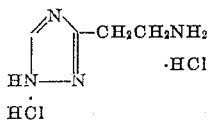

In accordance with the above equations, 1-(β-phthalimidopropionyl)-thiosemicarbazide is prepared by the reaction of β-phthalimidopropionyl chloride and thiosemicarbazide, and cyclization is brought about by the action of sodium methoxide to produce 3-β-phthalimidoethyl-1,2,4-triazole-5-thiol, which is oxidized with nitric acid to remove the thiol group and form 3-β-phthalimidoethyl-1,2,4-triazole, from which, upon treatment with hydrochloric acid, is obtained the desired 3-β-aminoethyl-1,2,4-triazole dihydrochloride.

From the 3-β-aminoethyl-1,2,4-triazole prepared as set forth hereinabove, substituted aminoethyl triazoles can be prepared by known methods of addition and substitution.

Alternatively, the substituted aminoethyl-1,2,4-triazoles of the invention can be prepared according to the method illustrated by the following series of equations showing the preparation of 3-β-methylaminoethyl-1,2,4-triazole.

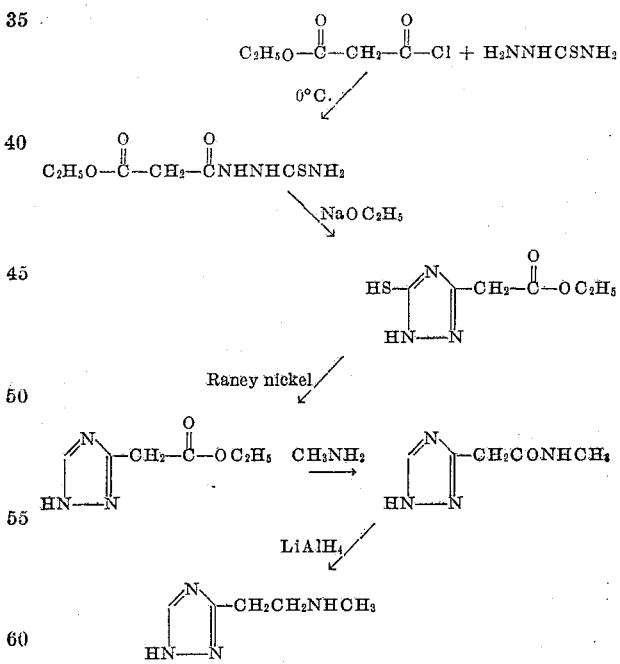

In accordance with the equations, ethylmalonyl chloride is reacted with thiosemicarbazide to form 1-(carbethoxyacetyl)-thiosemicarbazide, which is treated with sodium ethylate to accomplish cyclization to 3-carbethoxymethyl-1,2,4-triazole-5-thiol. Upon desulfurization of the last compound with Raney nickel, there is obtained ethyl-(1,2,4-triazolyl-3)-acetate. By treating the ester with methylamine, (1,2,4-triazolyl-3)-methylacetamide is formed, which when treated with lithium aluminum anhydride yields the desired 3-β-methylaminoethyl-1,2,4-triazole.

The bases of the new triazole compounds can be obtained from the acid addition salts by methods known to the art, as, for example, by addition of the stoichiometric equivalent of an alkali such as sodium methylate to an alcoholic solution of the acid addition salt, followed by removal of the sodium salt of the acid as by filtration, and evaporation of the solvent to leave the triazole base as a residue.

Acid addition salts of the new triazoles can be prepared by methods known to the art, as, for example, by the interaction of stoichiometrically equivalent amounts of the desired triazole base and a selected acid in solution in a mutual inert solvent, followed by removal of the solvent as by evaporation, distillation or the like. Similarly, the theoretical amount of a selected acid can be added to an organic solvent solution of the triazole base, whereupon precipitation of the acid addition salt takes place. Examples of inorganic acids which are suitable for the preparation of acid addition salts of the triazole compounds of the invention are hydrochloric, nitric, phosphoric, sulfuric and sulfamic acids. Likewise, examples of organic acids which are suitable for the preparation of acid addition salts of the triazoles are benzoic acid, acetic acid, salicylic acid, propionic acid, succinic acid, maleic acid, stearic acid and the like. The preferred acid addition salts of the new triazole compounds are the pharmaceutically useful acid addition salts, i. e., those acid addition salts which are not materially more toxic than the triazole bases from which they are derived, and which are suitable for incorporation into the various pharmaceutical dosage forms, such as capsules, tablets, suspensions, parenteral dosage forms, pharmaceutical extending media and the like.

The following examples will also illustrate the preparation and properties of the new substituted 3-ethyl-1,2,4-triazoles and their acid addition salts.

EXAMPLE 1

*Preparation of 3-β-aminoethyl-1,2,4-triazole dihydrochloride*

A mixture of 100 g. (1.1 mol.) of thiosemicarbazide and 700 ml. of anhydrous pyridine was cooled to $-5°$ C., and 237 g. (1 mol.) of β-phthalimidopropionyl chloride, prepared according to the method of Gabriel, Ber. 41, 242 (1908), were added in small portions with stirring over a one-hour period, at such a rate that the temperature of the reaction mixture did not exceed 0° C. The reaction mixture was allowed to stand for several hours and come to room temperature, and was then poured with stirring into two liters of ice water. A heavy white precipitate of 1-(β-phthalimidopropionyl)-thiosemicarbazide formed and was removed by filtration. The precipitate was washed with successive portions of ice water, 50 percent aqueous acetic acid and ice water. After recrystallization from acetic acid, 1-(β-phthalimidopropionyl)-thiosemicarbazide melted at about 238-239° C. with decomposition.

*Analysis.*—Calculated for $C_{12}H_{12}N_4O_3S$: C, 49.31; H, 4.14; S, 10.97. Found: C, 49.26; H, 4.29; S, 10.62.

A mixture of 300 g. (1 mol.) of 1-(β-phthalimidopropionyl)-thiosemicarbazide, 60 g. (1.1 mol.) of sodium methylate and 2500 ml. of absolute ethanol was heated under reflux for about sixteen hours. About two liters of the solvent was removed by evaporation in vacuo, and the residue was added with stirring to two liters of ice water containing 125 ml. of concentrated hydrochloric acid. A precipitate comprising 3-β-phthalimidoethyl-1,2,4-triazole-5-thiol formed, and was collected and washed with successive portions of water, 50 percent aqueous acetic acid, and glacial acetic acid.

After recrystallization from acetic acid, 3-β-phthalimidoethyl-1,2,4-triazole-5-thiol melted at about 295–297° C.

*Analysis.*—Calculated for $C_{12}H_{10}N_4O_2S$: C, 52.52; H, 3.67; N, 20.43; S, 11.68. Found: C, 52.40; H, 3.83; N, 20.67; S, 11.66.

100 g. of 3-β-phthalimidoethyl-1,2,4-triazole-5-thiol were added in small portions to a stirred solution of 100 ml. of concentrated nitric acid and 200 ml. of water containing 1 g. of sodium nitrite over a period of about one hour. The temperature was maintained below 45° C. during the addition of the thiol by means of a cooling water bath. A precipitate separated from the reaction mixture. The reaction mixture was cooled to 0° C. and cautiously neutralized using aqueous sodium carbonate. The precipitate was removed by filtration and washed with water. After recrystallization from water, the 3-β-phthalimidoethyl-1,2,4-triazole thus prepared melted at about 215° C.

*Analysis.*—Calculated for $C_{12}H_{10}N_4O_2$: C, 59.50; H, 4.16; N, 23.13. Found: C, 59.40; H, 4.12; N, 23.15.

A solution of 40 g. of 3-β-phthalimidoethyl-1,2,4-triazole in 500 ml. of 6 N HCl was heated under reflux for about eight hours. The reaction mixture was then cooled in an ice bath for several hours, whereupon phthalic acid separated and was removed by filtration. The aqueous filtrate was evaporated to dryness in vacuo, and the residue was dissolved in 500 ml. of warm methanol; the solution was treated with decolorizing carbon, filtered, and 1 liter of dry ether was added thereto. The solution was cooled, and the precipitate of 3-β-aminoethyl-1,2,4-triazole dihydrochloride which formed was removed by filtration and dried.

3-β-aminoethyl-1,2,4-triazole dihydrochloride thus prepared melted at about 215° C. with decomposition.

*Analysis.*—Calculated for $C_4H_{10}N_4Cl_2$: C, 25.96; H, 5.45; N, 30.28. Found: C, 26.22; H, 5.38; N, 30.23.

EXAMPLE 2

*Preparation of 3-β-aminoethyl-1,2,4-triazole*

A solution of 18.4 g. of 3-β-aminoethyl-1,2,4-triazole dihydrochloride and 100 ml. of ethanol was mixed with 10.8 g. of sodium methylate. After heating the mixture under reflux for two hours the sodium chloride was removed by filtration. The filtrate was evaporated in vacuo, and the residual oil, comprising 3-β-aminoethyl-1,2,4-triazole, was distilled in vacuo. The boiling point of the major portion of the oil was found to be about 160° C. at a pressure of 0.1 mm. of mercury. On standing, the distilled 3-β-aminoethyl-1,2,4-triazole solidified, and melted at about 83–85° C.

*Analysis.*—Calculated for $C_4H_8N_4$: C, 42.84; H, 7.19. Found: C, 42.60; H, 7.34.

EXAMPLE 3

*Preparation of 3-β-methylaminoethyl-1,2,4-triazole dihydrochloride*

To a suspension of 20 g. (0.21 mol.) of thiosemicarbazide in 100 ml. of dry pyridine maintained at a temperature of about 0° C. were added with stirring and over a period of about two hours 30 g. (0.20 mol.) of ethylmalonyl chloride. The resulting solution was allowed to stand at room temperature for about three days. The pyridine was then removed by evaporation in vacuo, and the residue was disssolved in 150 ml. of hot methanol. On cooling, the 1-(carbethoxyacetyl)-thiosemicarbazide crystallized from solution. The solid precipitate was removed by filtration and dried in air. On recrystallation from water, 1-carbethoxyacetyl)-thiosemicarbazide melted at about 182° C.

*Analysis.*—Calculated for $C_6H_{11}N_3O_3S$: C. 35.12; H, 5.40; N, 20.48. Found: C, 35.19; H, 5.51; N, 20.27.

To a solution formed from 1.2 g. (0.05 mol.) of sodium and 100 ml. of absolute ethanol were added 10 g. (0.05 mol.) of 1-(carbethoxyacetyl)-thiosemicarbazide. The mixture was heated under reflux for about sixteen hours, and the alcohol was evaporated in vacuo. The solid residue was dissolved in 100 ml. of water, and to the solution was added 9 ml. of 6 N HCl. A precipitate comprising 3-carbethoxymethyl-1,2,4-triazole-5-thiol formed and was collected by filtration, washed with water and crystallized from water. The 3-carbethoxymethyl-1,2,4-triazole-5-thiol thus prepared melted at about 192–194° C.

Analysis.—Calculated for $C_6H_9N_3O_2S$: C, 38.49; H, 4.85. Found: C, 38.34; H, 4.73.

To a solution of 10 g. (0.05 mol.) of 3-carbethoxymethyl-1,2,4-triazole-5-thiol in 50 ml. of ethanol were added 25 g. of Raney nickel. The stirred mixture was heated under reflux until the evolution of hydrogen sulfide had ceased. The reaction mixture was filtered, and the filtrate was evaporated to dryness in vacuo. The residue, consisting of ethyl-(1,2,4-triazolyl-3)-acetate, was crystallized from a small volume of ethanol, and found to melt at about 82–83° C.

Analysis.—Calculated for $C_6H_9N_3O_2$: C, 46.44; H, 5.85; N, 27.08. Found: C, 46.18; H, 5.61; N, 27.17.

A solution of 4 g. of ethyl-(1,2,4-triazolyl-3)-acetate in 5 ml. of methanol was saturated with dry methylamine at 0° C. and allowed to stand for about sixteen hours at room temperature. A precipitate consisting of (1,2,4-triazolyl-3)-N-methylacetamide formed and was removed by filtration. (1,2,4-triazolyl-3)-N-methylacetamide thus prepared melted at about 175–176° C.

Analysis.—Calculated for $C_5H_8N_4O$: C, 42.85; H, 5.75; N, 39.98. Found: C, 42.88; H, 6.03; N, 39.98.

A suspension of 1.4 g. (0.01 mol.) of (1,2,4-triazolyl-3)-N-methylacetamide and 1 g. of lithium aluminum anhydride in 100 ml. of anhydrous tetrahydrofuran was heated under reflux for about forty-eight hours. 5 ml. of 50 percent aqueous methanol were added to the reaction mixture and the precipitate which formed was removed by filtration. The filter cake was extracted twice with 100 ml. portions of methanol and twice with 100 ml. portions of water. The combined filtrates and extracts were evaporated to dryness in vacuo, the residue was dissolved in 100 ml. of ethanol and the ethanol solution was saturated with carbon dioxide by the addition thereto of Dry Ice. The alcohol was removed by evaporation in vacuo, and the residue was extracted with two 50 ml. portions of ethanol. The ethanol solution was filtered, concentrated to 25 ml. in volume and treated with 4.6 g. (0.02 mol.) of picric acid dissolved in 50 ml. of hot ethanol. The picrate salt of 3-β-methylaminoethyl-1,2,4-triazole rapidly separated and after cooling, was collected by filtration and air dried.

3-β-methylaminoethyl-1,2,4-triazole dipicrate thus prepared melted at about 160° C.

Analysis.—Calculated for $C_{17}H_{16}N_{10}O_{14}$: C, 34.94; H, 2.76; N, 23.97. Found: C, 34.90; H, 2.82; N, 23.75.

Five grams of the dipicrate salt thus prepared was dissolved in 50 ml. of nitrobenzene, and the solution was extracted with three successive 10 ml. portions of concentrated hydrochloric acid. The combined extracts were washed with chloroform, and evaporated to dryness in vacuo. The residue, consisting of the dihydrochloride salt of 3-β-methylaminoethyl-1,2,4-triazole, was crystallized from a mixture of methanol and ether.

3-β-methylaminoethyl-1,2,4-triazole dihydrochloride thus prepared melted at about 178° C.

Analysis.—Calculated for $C_5H_{12}N_4Cl_2$: C, 30.16; H, 6.08. Found: C, 30.40; H, 6.30.

3-β-methylaminoethyl-1,2,4-triazole base is prepared from the dihydrochloride salt by substantially the same procedure as described in Example 2.

EXAMPLE 4

*Preparation of 3-β-dimethylaminoethyl-1,2,4-triazole dihydrochloride*

A solution of 4 g. of ethyl-(1,2,4-triazolyl-3)-acetate in about 5 ml. of methanol was saturated with dry dimethylamine at about 0° C., and allowed to stand for about sixty-four hours at room temperature. The solvent was removed by evaporation in vacuo, and the resulting oily residue solidified on standing. The solid residue, consisting of the (1,2,4-triazolyl-3)-N,N-dimethylacetamide formed in the reaction, was crystallized from ethanol, and found to melt at about 103–4° C.

Analysis.—Calculated for $C_6H_{10}N_4O$: C, 46.74; H, 6.54; N, 36.34. Found: C, 46.46; H, 6.71; N, 36.56.

A suspension of 2.5 g. of (1,2,4-triazolyl-3)-N,N-dimethylacetamide and 2.5 g. of lithium aluminum anhydride in 100 ml. of tetrahydrofuran was treated according to the procedure of Example 3, to produce the picrate salt of 3-β-dimethylaminoethyl-1,2,4-triazole which after crystallization from water melted at about 180° C.

Analysis.—Calculated for $C_{18}H_{18}N_{10}O_{14}$: C, 36.13; H, 3.03; N, 23.41. Found: C, 35.97; H, 2.78; N, 23.32.

About 5 g. of 3-β-dimethylaminoethyl-1,2,4-triazole picrate suspended in 50 ml. of nitrobenzene, was extracted with three successive 10 ml. portions of concentrated hydrochloric acid. The combined extracts were washed with chloroform, and evaporated to dryness in vacuo. The residue, consisting of the 3-β-dimethylaminoethyl-1,2,4-triazole dihydrochloride which formed, was crystallized from a mixture of methanol and ether, and melted at about 155° C.

Analysis.—Calculated for $C_6H_{14}N_4Cl_2$: C, 33.81; H, 6.62. Found: C, 33.68; H, 6.70.

3-β-dimethylaminoethyl-1,2,4-triazole base is prepared by subjecting the dihydrochloride salt to substantially the same procedure as is described in Example 2.

EXAMPLE 5

*Preparation of 3-β-isopropylaminoethyl-1,2,4-triazole dihydrochloride*

Equimolar quantities of 3-β-aminoethyl-1,2,4-triazole and acetone were dissolved in ethanol, and platinum oxide catalyst was added thereto. The mixture was shaken under hydrogen pressure in a Parr apparatus. After the theoretical amount of hydrogen had been absorbed, the reaction mixture was filtered to remove the catalyst and the filtrate was evaporated to dryness in vacuo. The solid residue was 3-β-isopropylamino-1,2,4-triazole. The base was taken up in the minimum amount of ethanol and a hot solution of picric acid in ethanol was added thereto. An immediate separation of the picrate salt of 3-β-isopropylaminoethyl-1,2,4-triazole formed and was removed by filtration. After recrystallization from ethanol, 3-β-isopropylaminoethyl-1,2,4-triazole dipicrate melted at about 143–4° C.

Analysis.—Calculated for $C_{19}H_{20}N_{10}O_{14}$: C, 37.26; H, 3.29. Found: C, 37.54; H, 3.31.

The picrate salt of 3-β-isopropylaminoethyl-1,2,4-triazole was suspended in nitrobenzene and was extracted with several portions of concentrated hydrochloric acid. The combined acid extracts were washed with chloroform and evaporated to dryness in vacuo. The residue, consisting of 3-β-isopropylaminoethyl-1,2,4-triazole dihydrochloride was recrystallized from methanol-ether solution, and melted at about 186° C.

Analysis.—Calculated for $C_7H_{16}N_4Cl_2$: C, 37.01; H, 7.10; N, 24.67. Found: C, 36.68; H, 7.07; N, 24.65.

The free triazole base can be prepared from the dihydrochloride salt by substantially the same procedure as described in Example 2.

EXAMPLE 6

*Preparation of 3-β-benzylaminoethyl-1,2,4-triazole dihydrochloride*

Equimolar quantities of 3-β-aminoethyl-1,2,4-triazole and freshly distilled benzaldehyde, in alcohol solution, were heated on a steam bath for about two hours. Platinum oxide catalyst was added to the solution and the mixture was subjected to reduction with hydrogen. After the theoretical amount of hydrogen had been absorbed, the catalyst was removed from the reaction mixture by filtration, and anhydrous hydrogen chloride gas was passed through the clear filtrate. After the filtrate had been saturated with hydrogen chloride an equal volume of anhydrous ether was added, whereupon a precipitate of 3-β-benzylaminoethyl-1,2,4-triazole dihydrochloride formed and it was removed by filtration. After recrystallization from ethanol-ether solution, 3-β-benzylaminoethyl-1,2,4-triazole dihydrochloride melted at about 220° C.

*Analysis.*—Calculated for $C_{11}H_{16}N_4Cl_2$: N, 20.36; Cl, 25.77. Found: N, 20.61; Cl, 25.51.

The dipicrate salt of 3-β-benzylaminoethyl-1,2,4-triazole melted at about 115–116° C.

3-β-benzylaminoethyl triazole base is prepared by subjecting the dihydrochloride salt to substantially the same procedure as described in Example 2.

EXAMPLE 7

*Preparation of 3-β-acetamidoethyl-1,2,4-triazole hydrochloride*

A mixture of 5.5 g. (0.03 mol.) of 3-β-aminoethyl-1,2,4-triazole dihydrochloride, 1 g. of sodium hydroxide, and 40 ml. of 2 M aqueous sodium hydroxide solution was maintained at 0° C. and treated with 2 ml. of acetic anhydride. The resulting solution was neutralized with hydrochloric acid, and evaporated to dryness in vacuo. The residue was extracted with three 20 ml. portions of absolute ethanol, and the combined ethanol extracts were treated with anhydrous ether, whereupon a precipitate formed. The precipitate, consisting of 3-β-acetamidoethyl-1,2,4-triazole monohydrochloride formed in the reaction, was collected and crystallized from a 1:1 mixture of ethanol-ether. It melted at about 160° C.

*Analysis.*—Calculated for $C_6H_{11}N_4OCl$: C, 37.81; H, 5.82; Cl, 18.61. Found: C, 37.94; H, 5.77; Cl, 18.94.

EXAMPLE 8

*Preparation of 3-β-benzamidoethyl-1,2,4-triazole*

To a mixture of 5.5 g. (0.03 mol.) of 3-β-aminoethyl-1,2,4-triazole dihydrochloride and 100 ml. of 2 N sodium solution maintained at about 0° C. were added with stirring 2.8 g. (0.02 mol.) of benzoyl chloride. After stirring for about two hours, 25 g. of ice were added, and the mixture was acidified to pH 5 using concentrated hydrochloric acid. The solid which formed on standing was removed by filtration, resuspended in dilute sodium bicarbonate solution and collected by filtration. After recrystallization from water, 3-β-benzamidoethyl-1,2,4-triazole melted at about 189–190° C.

*Analysis.*—Calculated for $C_{11}H_{12}N_4O$: C, 61.09; H, 5.59; N, 25.91. Found: C, 60.99; H, 5.45; N, 25.71.

EXAMPLE 9

*Preparation of 3-β-aminoethyl-1,2,4-triazole sulfate*

To a solution of 11.2 g. (0.10 mol.) of 3-β-amino ethyl-1,2,4-triazole prepared according to the procedure of Example 2 in 150 ml. of ethanol are added 5.55 ml. (0.10 mol.) of concentrated sulfuric acid (specific gravity 1.84). The resulting solution is well stirred and cooled, and is then evaporated in vacuo. The solid residue which is obtained is 3-β-aminoethyl-1,2,4-triazole sulfate.

By following the same procedure, but using stoichiometrically equivalent quantities of nitric, phosphoric, acetic, and benzoic acids, the dinitrate, phosphate, diacetate and dibenzoate salts of 3-β-aminoethyl-1,2,4-triazole, respectively, are obtained.

We claim:

1. A compound selected from the group consisting of a base represented by the formula

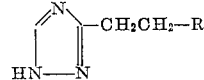

wherein R represents a member of the group consisting of amino, lower alkylamino, lower dialkylamino, monocyclic arylcarboxyacylamino, lower aliphatic-carboxyacylamino, and monocyclic-aryl-lower-alkylamino radicals; and acid addition salts thereof.

2. 3-β-aminoethyl-1,2,4-triazole represented by the formula

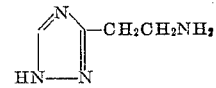

3. 3-β-methylaminoethyl-1,2,4-triazole represented by the formula

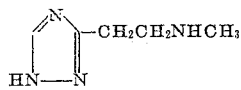

4. 3-β-isopropylaminoethyl-1,2,4-triazole represented by the formula

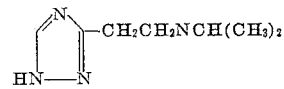

5. 3-β-benzylaminoethyl-1,2,4-triazole represented by the formula

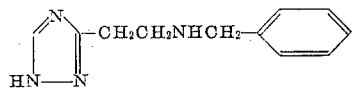

6. 3-β-acetamidoethyl-1,2,4-triazole hydrochloride represented by the formula

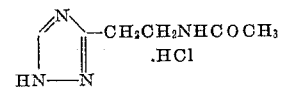

No references cited.